US011433749B2

(12) United States Patent
Boyle et al.

(10) Patent No.: US 11,433,749 B2
(45) Date of Patent: Sep. 6, 2022

(54) VEHICLE CONVERTIBLE TOP SYSTEMS

(71) Applicants: Michael S Boyle, Berkley, MI (US); Mikil L Sockow, Troy, MI (US); David C Fischer, Troy, MI (US); Cole T Schaenzer, Royal Oak, MI (US); Robert Rizzo, Macomb, MI (US); Christopher J Allen, Pleasant Ridge, MI (US); Jimmy L Suder, Ortonville, MI (US)

(72) Inventors: Michael S Boyle, Berkley, MI (US); Mikil L Sockow, Troy, MI (US); David C Fischer, Troy, MI (US); Cole T Schaenzer, Royal Oak, MI (US); Robert Rizzo, Macomb, MI (US); Christopher J Allen, Pleasant Ridge, MI (US); Jimmy L Suder, Ortonville, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/124,821

(22) Filed: Dec. 17, 2020

(65) Prior Publication Data
US 2021/0178872 A1    Jun. 17, 2021

Related U.S. Application Data

(60) Provisional application No. 62/949,040, filed on Dec. 17, 2019.

(51) Int. Cl.
*B60J 7/11*    (2006.01)
*B60J 7/14*    (2006.01)
*B60J 1/08*    (2006.01)
*B60J 1/18*    (2006.01)
(Continued)

(52) U.S. Cl.
CPC .............. *B60J 7/11* (2013.01); *B60J 7/141* (2013.01); *B60J 1/085* (2013.01); *B60J 1/183* (2013.01);
(Continued)

(58) Field of Classification Search
CPC ... B60J 7/11; B60J 7/0076; B60J 7/106; B60J 7/1607; B60J 7/1664; B60J 33/04; B60J 33/046; B60J 7/141
See application file for complete search history.

(56) References Cited

U.S. PATENT DOCUMENTS 5,015,028 A    5/1991  Bonnett
6,890,014 B1 *  5/2005  King ...................... B60P 3/423
                                              296/26.09
(Continued)

FOREIGN PATENT DOCUMENTS

EP    1184218 B1    1/2007
FR    2985456 A1    7/2013

OTHER PUBLICATIONS

International Search Report and Written Opinion dated Mar. 11, 2021 for International Application No. PCT/US2020/065459, International Filing Date Dec. 17, 2020.

*Primary Examiner* — Jason S Morrow
(74) *Attorney, Agent, or Firm* — Ralph E. Smith

(57) ABSTRACT

A vehicle includes a vehicle body including a truck bed at least partially defining a cargo area, a vehicle interior with front passenger seating and rear passenger seating, and a modular, multi-component hard top assembly. The hard top assembly is configured to selectively and removably couple interchangeably between (i) the vehicle body to provide an enclosed configuration at least partially enclosing the vehicle interior, and (ii) the truck bed to function as a truck bed storage cover to enclose the cargo area and provide a securable storage compartment. The multi-component hard (Continued)

top assembly is detachable from the vehicle body to provide an open air configuration for the vehicle interior.

17 Claims, 7 Drawing Sheets

(51) Int. Cl.
    *B60J 7/10*        (2006.01)
    *B60J 7/00*        (2006.01)
    *B62D 33/04*     (2006.01)

(52) U.S. Cl.
    CPC ............ *B60J 1/1823* (2013.01); *B60J 7/0076* (2013.01); *B60J 7/106* (2013.01); *B62D 33/04* (2013.01)

(56) References Cited

U.S. PATENT DOCUMENTS

| | | | |
|---|---|---|---|
| 7,240,960 B2 | 7/2007 | Fallis, III et al. | |
| 8,408,623 B1 | 4/2013 | McAuliff | |
| 8,764,095 B2 | 7/2014 | Ritzinger et al. | |
| 8,991,896 B1* | 3/2015 | Whitehead | B60J 7/106 296/121 |
| 10,604,194 B2* | 3/2020 | Mar | B60J 7/12 |
| 10,611,217 B2* | 4/2020 | Willard | B60J 7/194 |
| 10,787,131 B2* | 9/2020 | Marchlewski | B60R 9/058 |
| 2002/0105205 A1 | 8/2002 | Willard | |
| 2007/0164587 A1* | 7/2007 | Brockhoff | B60J 7/11 296/218 |
| 2008/0231072 A1 | 9/2008 | Franco et al. | |
| 2015/0197290 A1* | 7/2015 | Chapman | B60J 7/1607 296/100.08 |
| 2015/0283951 A1 | 10/2015 | Singleton | |
| 2018/0222299 A1* | 8/2018 | Volpicelli | B60J 7/1642 |
| 2019/0329638 A1 | 10/2019 | Willard et al. | |
| 2021/0170847 A1* | 6/2021 | Singer | B60J 7/026 |
| 2021/0178873 A1* | 6/2021 | Boyle | B60J 1/183 |
| 2021/0178874 A1* | 6/2021 | Boyle | B60J 7/141 |
| 2021/0268882 A1* | 9/2021 | Mather | B60J 1/1853 |

* cited by examiner

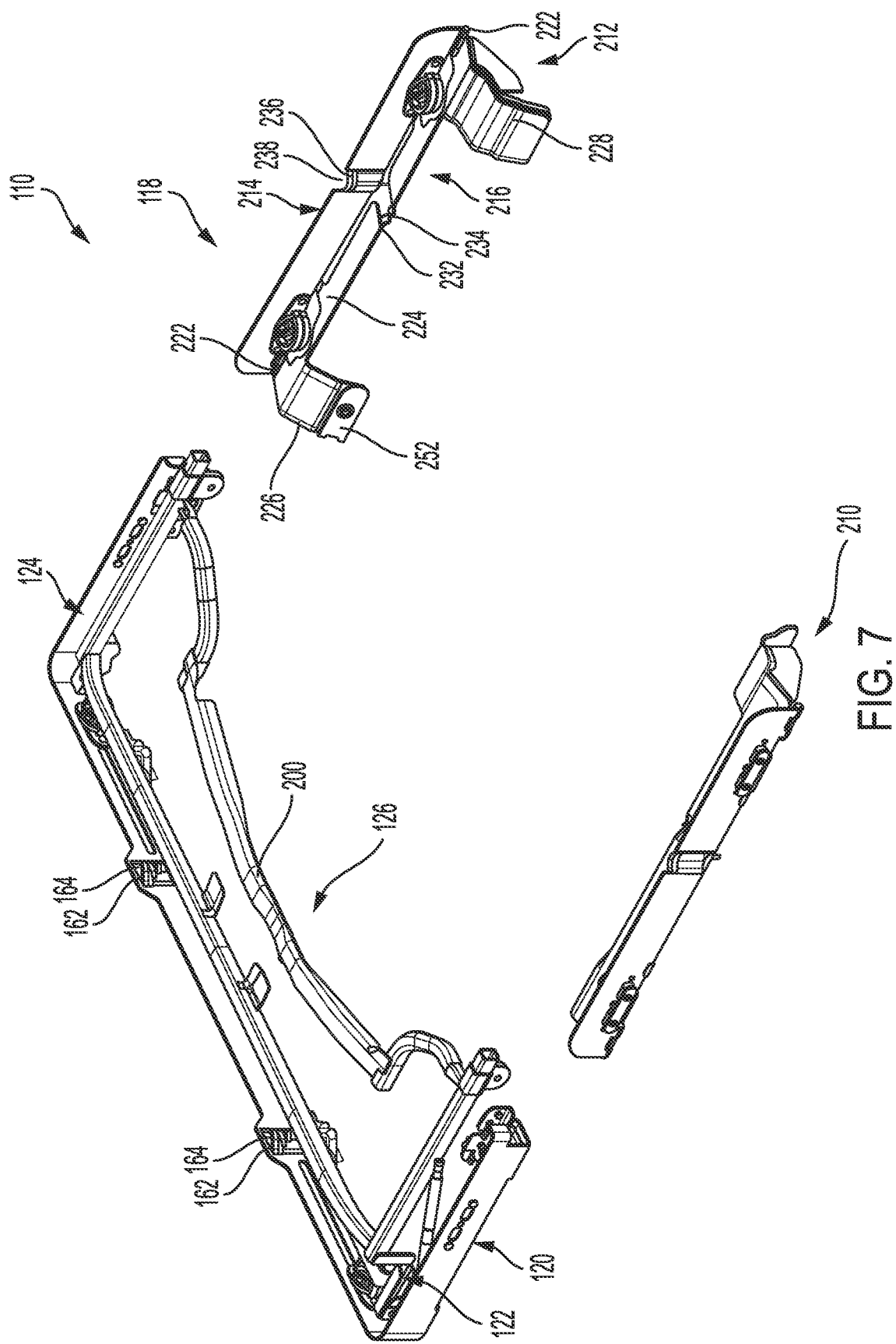

VEHICLE CONVERTIBLE TOP SYSTEMS

CROSS REFERENCE TO RELATED APPLICATION

This application claims the benefit of U.S. Prov. App. No. 62/949,040, filed Dec. 17, 2019, the contents of which are incorporated herein by reference thereto.

FIELD

The present application relates generally to vehicle convertible top systems and, more particularly, to modular multi-component hard top systems for a vehicle.

BACKGROUND

It is known in the motor vehicle art to provide a convertible top, which may be folded back or removed from the vehicle. In one example, the convertible top is constructed of a rigid/hard material (e.g., referred to as a hard top). Such convertible tops provide the user with the benefit of open air driving while affording available protection in the event of adverse weather conditions. However, hard top systems typically must be removed as one or more large components, which can be very heavy, thus requiring multiple people or special equipment to completely remove those systems from the vehicle. Further, such hard top systems cannot be stored on the vehicle when removed. Therefore, while such convertible tops work well for their intended purpose, it is desirable to provide improvements in the relevant art.

SUMMARY

In accordance with one example aspect of the invention, a vehicle is provided. In one example implementation, the vehicle includes a vehicle body including a truck bed at least partially defining a cargo area, a vehicle interior with front passenger seating and rear passenger seating, and a modular, multi-component hard top assembly. The hard top assembly is configured to selectively and removably couple interchangeably between (i) the vehicle body to provide an enclosed configuration at least partially enclosing the vehicle interior, and (ii) the truck bed to function as a truck bed storage cover to enclose the cargo area and provide a securable storage compartment. The multi-component hard top assembly is detachable from the vehicle body to provide an open air configuration for the vehicle interior.

In addition to the foregoing, the described vehicle may include one or more of the following features: wherein the hard top assembly includes a plurality of removable roof panels selectively coupleable to the vehicle body to create a substantially contiguous roof over the vehicle interior, wherein each removable roof panel of the plurality of removable roof panels is separately removable from the vehicle body to provide an open air configuration at that specific location of the hard top assembly while enabling a user to detach, remove, and transport a smaller portion of the hard top assembly without assistance or specialized equipment; wherein the multi-component hard top assembly further comprises a pair of removable C-pillars each separately removable from the vehicle body to provide further open air configuration while enabling the user to detach, remove, and transport the C-pillars of the hard top assembly without assistance or specialized equipment; and wherein the multi-component hard top assembly further includes a removable rear window assembly selectively detachable from the vehicle body to provide an open air configuration at the rear passenger seating while enabling the user to detach, remove, and transport the removable rear window assembly of the hard top assembly without assistance or specialized equipment.

In addition to the foregoing, the described vehicle may include one or more of the following features: wherein the plurality of removable roof panels includes a left front removable roof panel configured to removably and interchangeably couple to (i) the vehicle body in a location above a driver's side of the front passenger seating, and (ii) the truck bed in a left forward location thereof, and a right front removable roof panel configured to removably couple to: (i) the vehicle body in a location above a front passenger side of the front passenger seating, and (ii) the truck bed in a right forward location thereof; wherein the left and right front removable roof panels are rotatably coupled to the truck bed and configured to function as a truck bed lid movable between an open position and a closed position; and wherein the plurality of removable roof panels further includes a rear removable roof panel configured to removably and rotatably couple to the truck bed to function as a second truck bed lid movable between an open position and a closed position.

In addition to the foregoing, the described vehicle may include one or more of the following features: wherein the plurality of removable roof panels includes a rear removable roof panel configured to removably and interchangeably couple to (i) the vehicle body in a location above the rear passenger seating, and (ii) the truck bed in a rearward location thereof; wherein the rear removable roof panel is rotatably coupled to the truck bed and configured to function as a truck bed lid movable between an open position and a closed position; wherein the plurality of removable roof panels includes a removable front passenger roof panel and a removable rear passenger roof panel; and a truck bed hard top support system coupled to the truck bed and configured to support the front and rear passenger roof panels on the truck bed.

In addition to the foregoing, the described vehicle may include one or more of the following features: wherein the truck be hard top support system is configured to move between a deployed position at least partially above the truck bed to support the front and rear passenger roof panels, and a retracted position retracted downward into the truck bed; wherein the truck bed hard top support system comprises a forward cover support assembly configured to support the front passenger roof panel; and wherein the forward cover support assembly is configured rotate the front passenger roof panel between a closed position that at least partially encloses the cargo area, and a lifted open position that allows access to the cargo area.

In addition to the foregoing, the described vehicle may include one or more of the following features: wherein the forward cover support assembly includes a base structure, a retracting structure, a main panel support structure, and a secondary panel support structure; wherein the retracting structure rotatably couples the main panel support structure to the base structure such that the main panel support structure is movable between a deployed position to support the front passenger roof panel, and a retracted position within the truck bed; and wherein the secondary panel support structure is rotatably coupled to the main panel support structure and is movable between a deployed position to support the front passenger roof panel, and a stowed position to provide increased space in the cargo area.

In addition to the foregoing, the described vehicle may include one or more of the following features: wherein the truck bed hard top support system comprises a rearward cover support assembly configured to support the rear passenger roof panel; wherein the rearward cover support assembly is configured to rotate the rear passenger roof panel between a closed position that at least partially encloses the cargo area, and a lifted open position that allows access to the cargo area; and wherein the rearward cover support assembly includes a left side assembly coupled to left side wall of the truck bed, and a right side assembly coupled to the right side wall of the truck bed, wherein the rearward cover support assembly is movable between a deployed position to support the rear passenger roof panel, and a retracted position retracted downward into the truck bed.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 7 is a perspective view of the hard top support system shown in FIG. 6, in a retracted position, in accordance with the principles of the present disclosure.

DESCRIPTION

According to the principles of the present application, systems and methods are described for vehicle convertible top systems. In the example embodiments, the convertible top systems include a modular, multi-piece hard top assembly that enables removal of one or more rigid hard top pieces above passengers to create a more open air experience, particularly for rear seat passengers. Such a design advantageously breaks the hard top assembly into more manageable pieces, thereby making the removal of the hard top much easier.

Additionally, once removed, portions of the hard top assembly can be fitted onto the vehicle and double as a lockable truck bed storage cover. In this way, a single operator can remove the vehicle roof and secure the panels on top of the truck bed to provide a completely securable (e.g., lockable) truck bed storage once the tailgate is lifted and locked. In some examples, a hard top support system is configured to separately and rotatably support forward and rearward hard top roof panels. This enables selective opening of the rear panel or the forward panel(s) to allow access to different areas of the truck bed. When not utilized, the hard top support system is movable to a retracted position within the truck bed, thereby allowing a soft tonneau cover to be attached to the truck bed for covering thereof.

Figure 1:
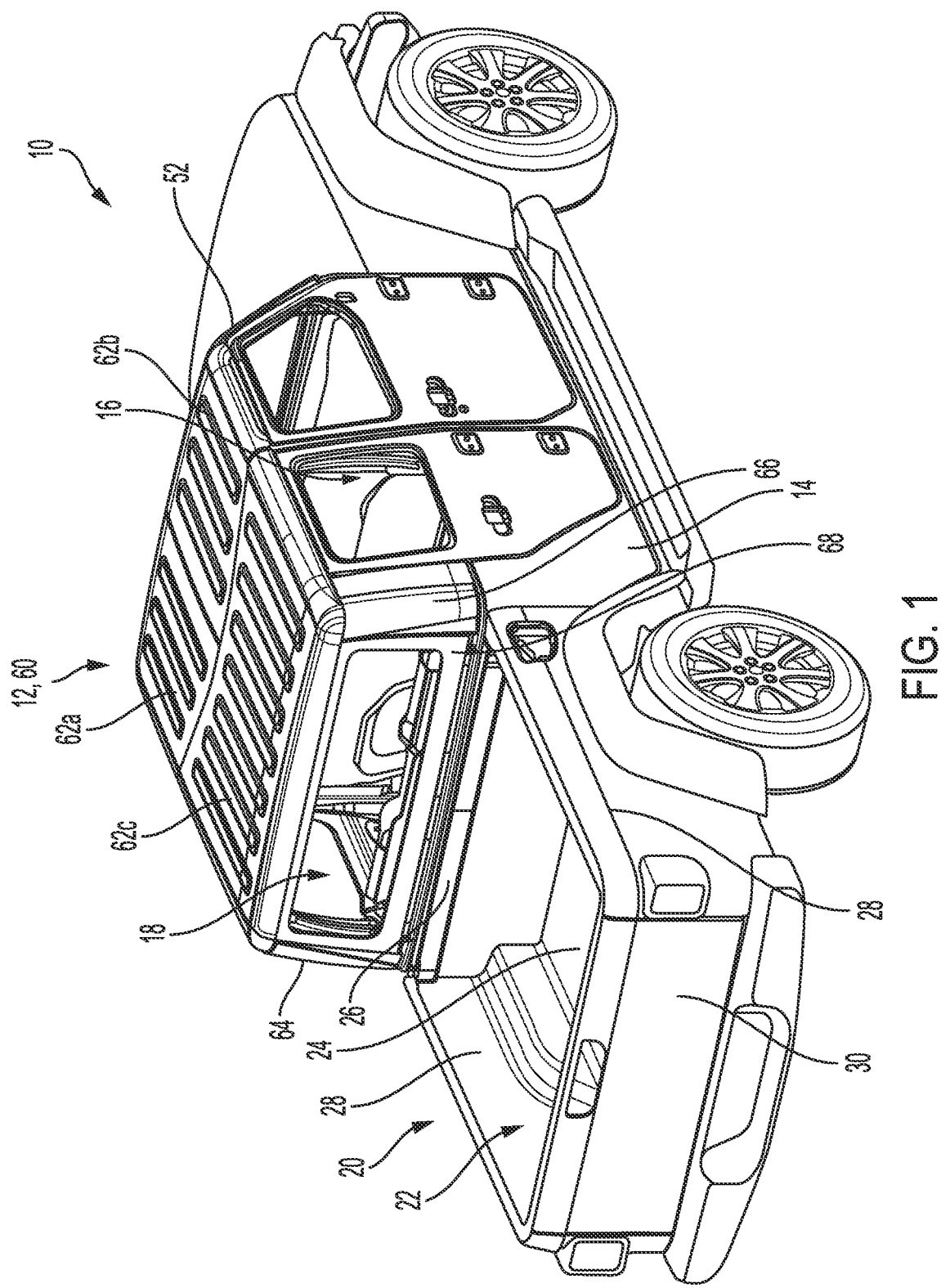
FIG. 1 is a perspective view of a vehicle with an example modular multi-component hard top assembly in accordance with the principles of the present disclosure.
Figure 2:
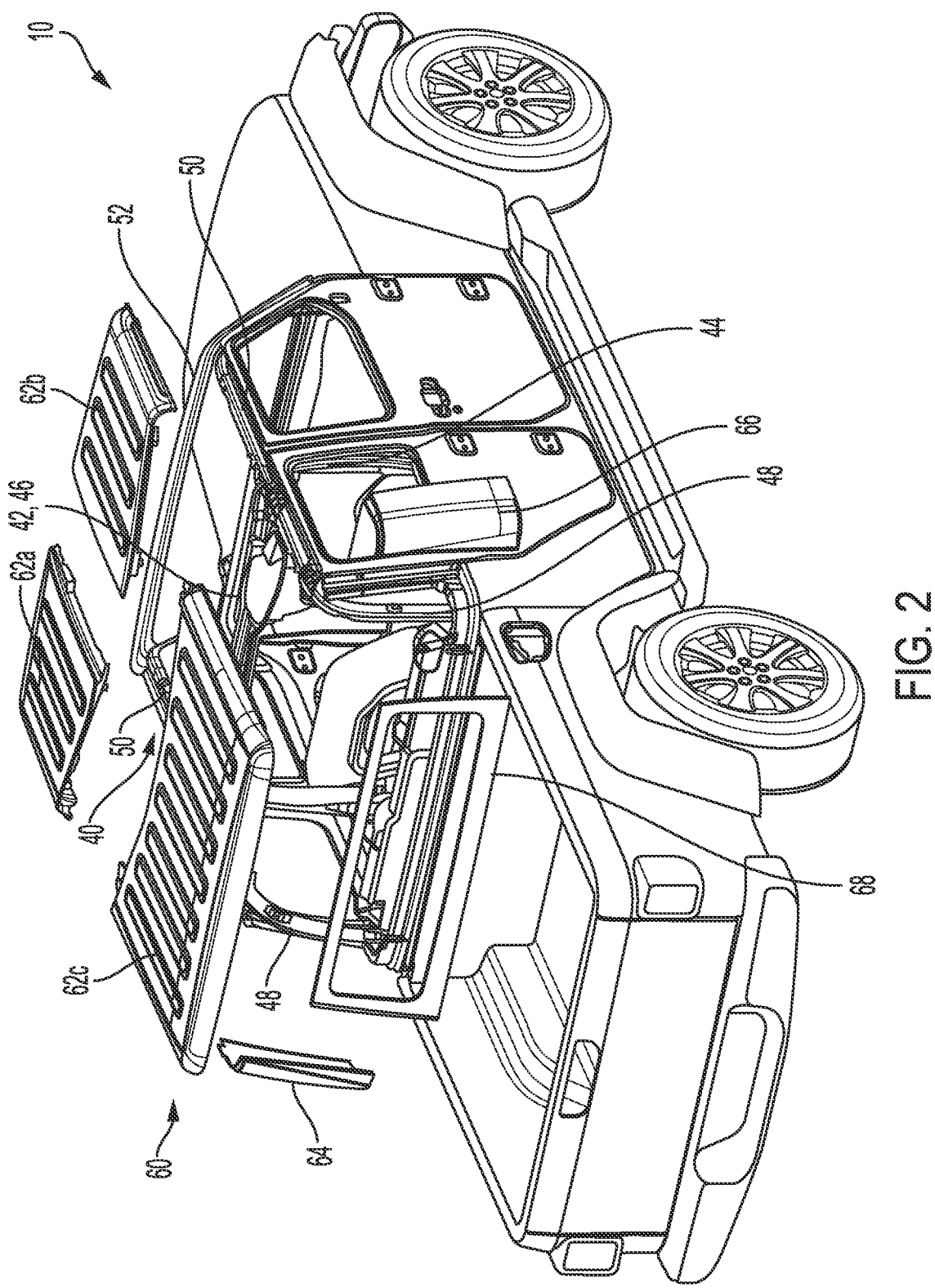
FIG. 2 is an exploded view of the example hard top assembly shown in FIG. 1, in accordance with the principles of the present disclosure.

With initial reference to FIGS. 1 and 2, a vehicle 10 having a convertible top system 12 in accordance with the principles of the present disclosure is illustrated. In the example embodiment, the vehicle 10 generally includes a vehicle body 14, an interior with front passenger seating 16 and rear passenger seating 18, and a storage or truck bed 20. In the example embodiment, vehicle 10 is a pickup truck, but it will be appreciated that the systems described herein may be utilized with various other types of vehicles. The truck bed 20 provides a cargo area 22 defined at least partially by a floor 24, a forward wall 26, side walls 28, and a tailgate 30, which is rotatably coupled to the vehicle body 14 and movable between an open position (not shown) and a closed position (shown).

In the example embodiment, as shown in FIG. 2, a roll bar assembly 40 extends upwardly from the vehicle body 14 and includes a generally U-shaped main roll bar 42 formed by a pair of laterally spaced apart vertical members 44 interconnected by a transverse member 46. A pair of rear roll bars 48 are coupled to the main roll bar 42 and extend rearward therefrom and downwardly to the vehicle body 14. A pair of laterally spaced apart side bars 50 are coupled to the main roll bar 42 and extend forwardly to a vehicle windshield assembly 52.

With continued reference to FIG. 1, in the example embodiment, the convertible top system 12 is a multi-component hard top assembly 60 that generally includes a plurality of removable front passenger roof panels 62a-b, a removable rear passenger roof panel 62c, a pair of removable C-pillars 64, 66, and a removable rear window assembly 68. As shown in FIG. 2, each of the front passenger roof panels 62a-b, rear passenger roof panel 62c, removable C-pillars 64, 66, and rear window assembly 68 are separately and removably secured to the roll bar assembly 40 and/or windshield assembly 52. In some examples, the roof panels 62a-b are a single panel. In other examples, the rear window assembly 68 can be rotatably coupled to the forward wall 26 to enable the rear window assembly 68 to move between a closed, upward position (FIG. 1) and an open, downward position (not shown).

Figure 5:
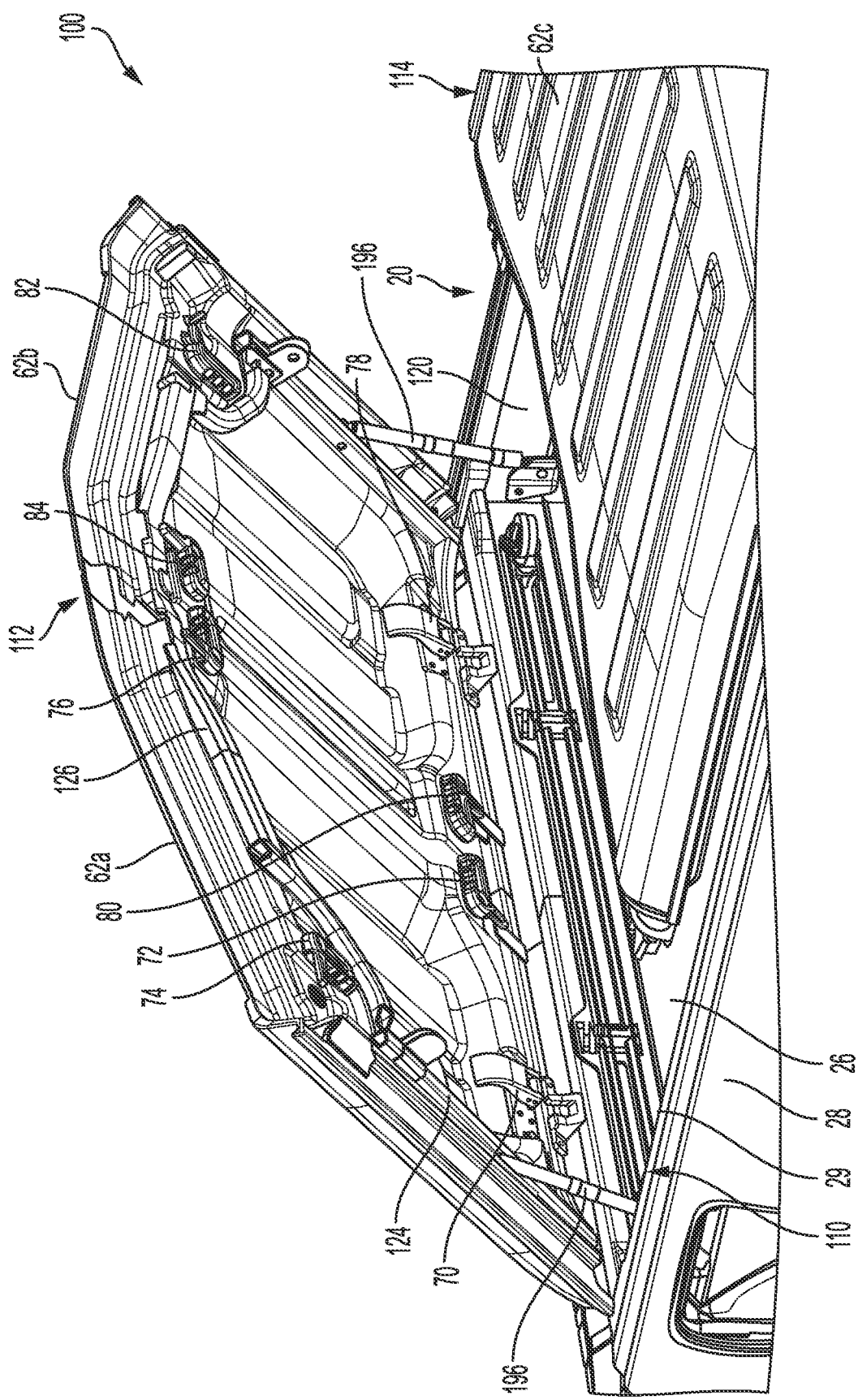
FIG. 5 is perspective view of the hard top assembly shown in FIG. 3 with a single lid in the open position, in accordance with the principles of the present disclosure.

With additional reference to FIG. 5, in the example embodiment, the left front passenger roof panel 62a is removably coupled to the windshield assembly 52 by a locking latch 70 and a first rotatable locking lever 72, and removably coupled to the rear passenger roof panel 62c by a second rotatable locking lever 74 and a third rotatable locking lever 76. Similarly, the right front passenger roof panel 62b is removably coupled to the windshield assembly 52 by a locking latch 78 and a first rotatable locking lever 80, and removably coupled to the rear passenger roof panel 62c by a second rotatable locking lever 82 and a third rotatable locking lever 84. In general, the rotatable locking levers are configured to rotate (e.g., 90°) from a locked position that engages another component such that the panel is locked thereto, to an unlocked position where the locking lever does not engage the other component, thereby allowing separation of the panel from the other component. Locking latches may be a linkage configured to selectively engage and lock to another component, for example, the windshield assembly 52. However, it will be appreciated that locking levers and locking latches may have any suitable structure or configuration that enables hard top assembly 60 to function as described herein.

Figure 4:
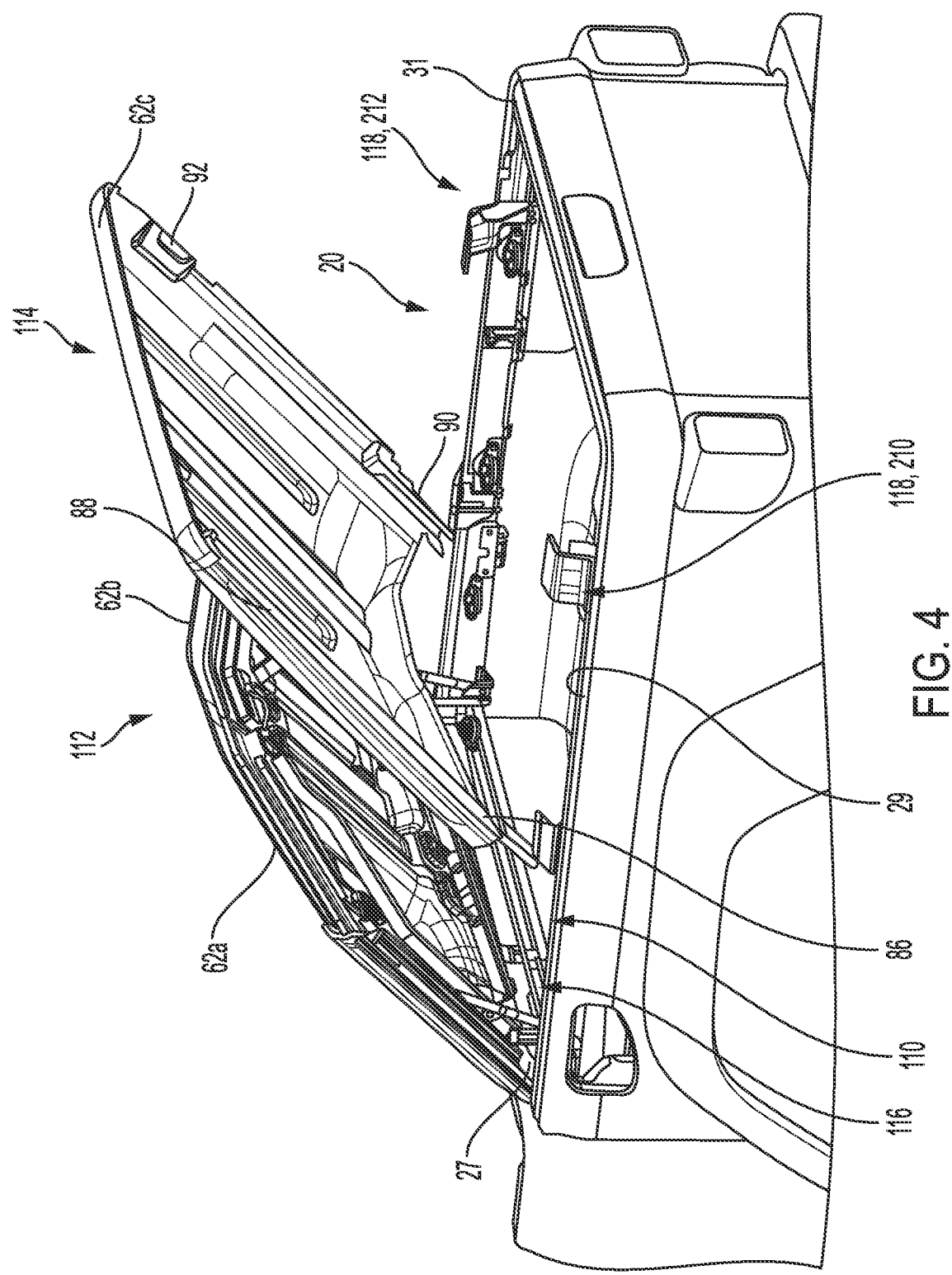
FIG. 4 is a perspective view of the hard top assembly shown in FIG. 3 with dual lids in an open position, in accordance with the principles of the present disclosure.

In the example embodiment, the rear passenger roof panel 62c is removably coupled to the roll bar assembly 40 on the left side by a first rotatable locking lever 86 and a second rotatable locking lever 88, and on the right side by a third rotatable locking lever 90 and a fourth rotatable locking lever 92 (e.g., see FIG. 4). The removable C-pillars 64, 66 are removably coupled to the roll bar assembly 40, the vehicle body 14, the rear passenger roof panel 62c, and/or the rear window assembly 68. The rear window assembly 68 is removably coupled to the forward wall 26, C-pillars 64, 66, and/or rear passenger roof panel 62c, or in other configurations, rotatably coupled to the forward wall 26. When assembled, the hard top assembly 60 provides a sealed contiguous or substantially contiguous vehicle roof over the vehicle interior cabin.

Advantageously, in the example embodiment shown in FIG. 2, left front removable roof panel 62a is selectively uncoupleable from the hard top assembly 60 to provide an open air configuration over the driver's side of front passenger seating 16, and right front removable roof panel 62b is selectively uncoupleable from the hard top assembly 60 to provide an open air configuration over the front passenger's side of front passenger seating 16. Similarly, rear removable roof panel 62c is selectively uncoupleable from the hard top assembly 60 to provide an open air configuration over the entire rear passenger seating 18. To provide further open air configuration to the rear passenger seating 18, the removable C-pillars 64, 66 and rear window assembly 68 are selectively uncoupleable from the hard top assembly 60.

FIG. 1 illustrates the vehicle 10 with the hard top assembly 60 assembled onto the vehicle body 14. If desired, a user can remove one or more portions of the hard top assembly 60 from the vehicle body 14. In this way, the hard top assembly 60 enables the ability to create an open air experience by removing the front passenger roof panels 62a-b, rear passenger roof panels 62c, C-pillars 64, 66, and rear window assembly 68, as shown in FIG. 2. Unlike a single piece assembly, the hard top assembly 60 includes multiple separately removable panels/windows/components that enable a single person to easily convert the vehicle 10 from an enclosed configuration (hard top assembly attached, FIG. 1) to an open-air configuration (hard top assembly, or portions thereof, removed) for example, as shown in FIG. 2.

Figure 3:
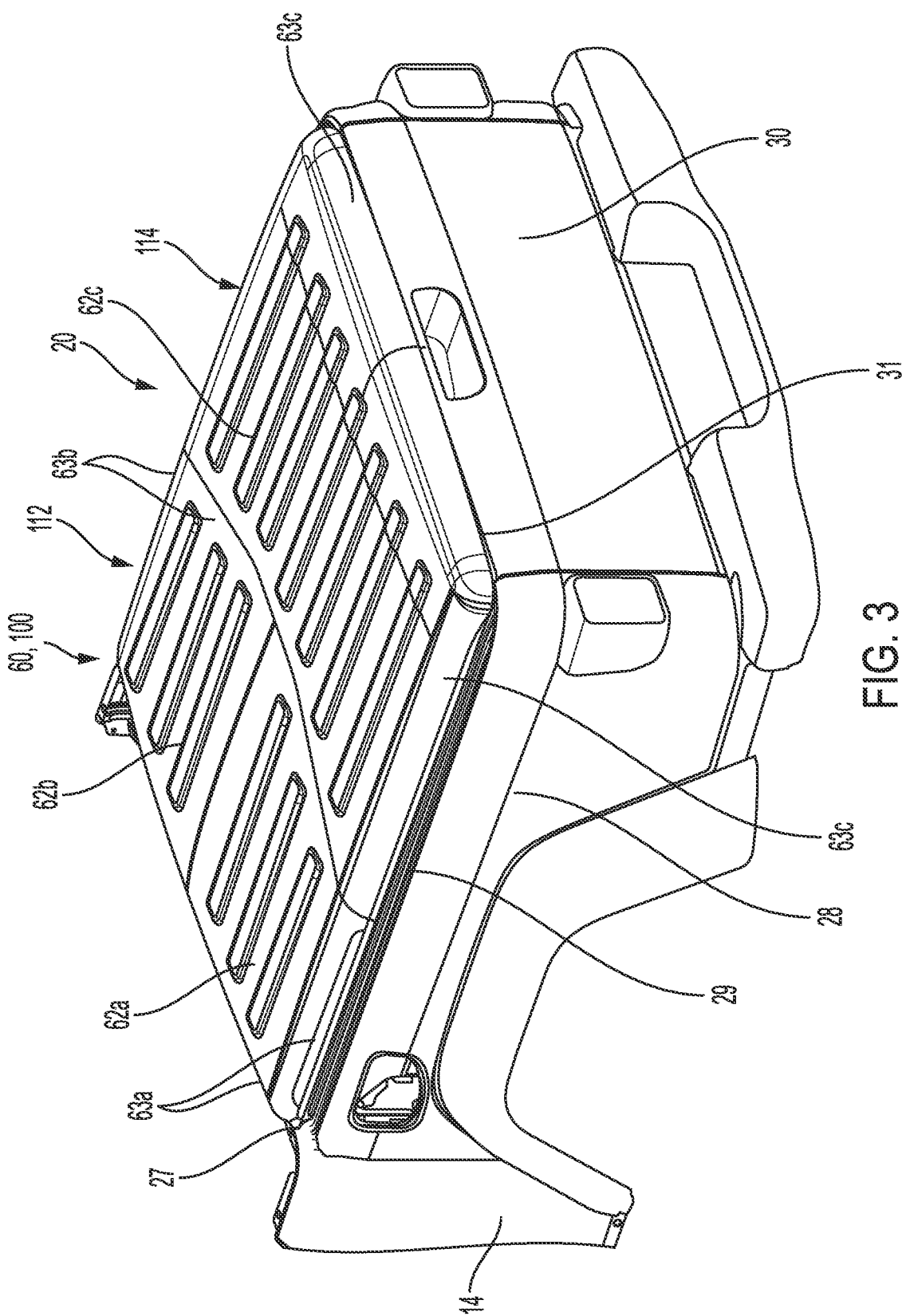
FIG. 3 is a perspective view of a portion of the hard top assembly shown in FIG. 1 assembled onto a truck bed of the vehicle, in accordance with the principles of the present disclosure.

With reference now to FIGS. 3-5, hard top assembly 60 is advantageously configured to be removed from the roll bar assembly 40 and subsequently installed on/over the truck bed 20 to provide a lockable truck bed storage cover 100. In this way, a single operator can remove the vehicle hard top roof and secure the roof panels on top of the truck bed to provide a securable storage compartment. In some implementations, the hard top roof panels are supported by a truck bed hard top support system 110. This provides the lockable truck bed storage cover 100 with a dual lid lift system that enables a forward lid 112 and a rearward lid 114 to each separately move between a closed position that encloses and secures the cargo area 22 (see FIG. 3), and a lifted, open position that allows access to the cargo area 22 (see FIG. 4).

With continued reference to FIGS. 3-5, in the example embodiment, the rear passenger roof panel 62c is configured to be removed from the roll bar assembly 40 and placed onto the truck bed 20 such that at least a portion of perimeter edges 63c are oriented above the side walls 28 and tailgate 30 to seal against respective top surfaces 29 and 31 thereof (e.g., see FIG. 3). Similarly, the front passenger roof panels 62a-b are configured to be removed from the roll bar assembly 40 and placed onto the truck bed 20 such that at least a portion of perimeter edges 63a, 63b are oriented above the forward wall 26, side walls 28, and/or rear passenger roof panel 62c to seal against forward wall top surface 27, side wall top surfaces 29, and/or rear roof panel perimeter edge 63a. In this way, the hard top assembly 60 can double both as an overhead passenger roof as well as the lockable truck bed storage cover 100. In one embodiment, the roof panels 62a-c are simply releasably secured to forward wall 26, side walls 28, and/or tailgate 30 via direct engagement with locking latches and locking levers 70-92.

With reference now to FIGS. 4-7, in other embodiments, the truck bed hard top support system 110 will be described in more detail. As described herein, the truck bed hard top support system 110 is configured to support the truck bed storage cover 100, which is comprised of the front passenger roof panels 62a-b and the rear passenger roof panel 62c. More specifically, the truck bed storage cover 100 includes a forward lid 112 comprised of the front passenger roof panels 62a-b, and a rearward lid 114 comprised of the rear passenger roof panel 62c. The forward lid 112 and the rearward lid 114 are each rotatably coupled to the truck bed hard top support system 110 and movable from the closed position (FIG. 3) to the open position (FIG. 4).

Additionally, when truck bed storage cover 100 is not in use, the truck bed hard top support system 110 is movable from a raised deployed position (FIG. 6) that supports the truck bed storage cover 100 on/above the truck bed 20, to a lowered retracted position (FIG. 7) within the cargo area 22. This allows the use of a soft cover (e.g., tonneau cover, not shown) over the truck bed 20 when in the retracted position. When the secured truck bed is desired, the soft cover is simply removed from truck bed 20 and the truck bed hard top support system 110 is moved to the deployed position to receive the truck bed storage cover 100, as described herein in more detail. Advantageously, the soft cover may then be removably coupled to the vehicle 10 in a position above the front and rear passenger seating 16, 18 to thereby provide a soft top roof configuration.

Figure 6:
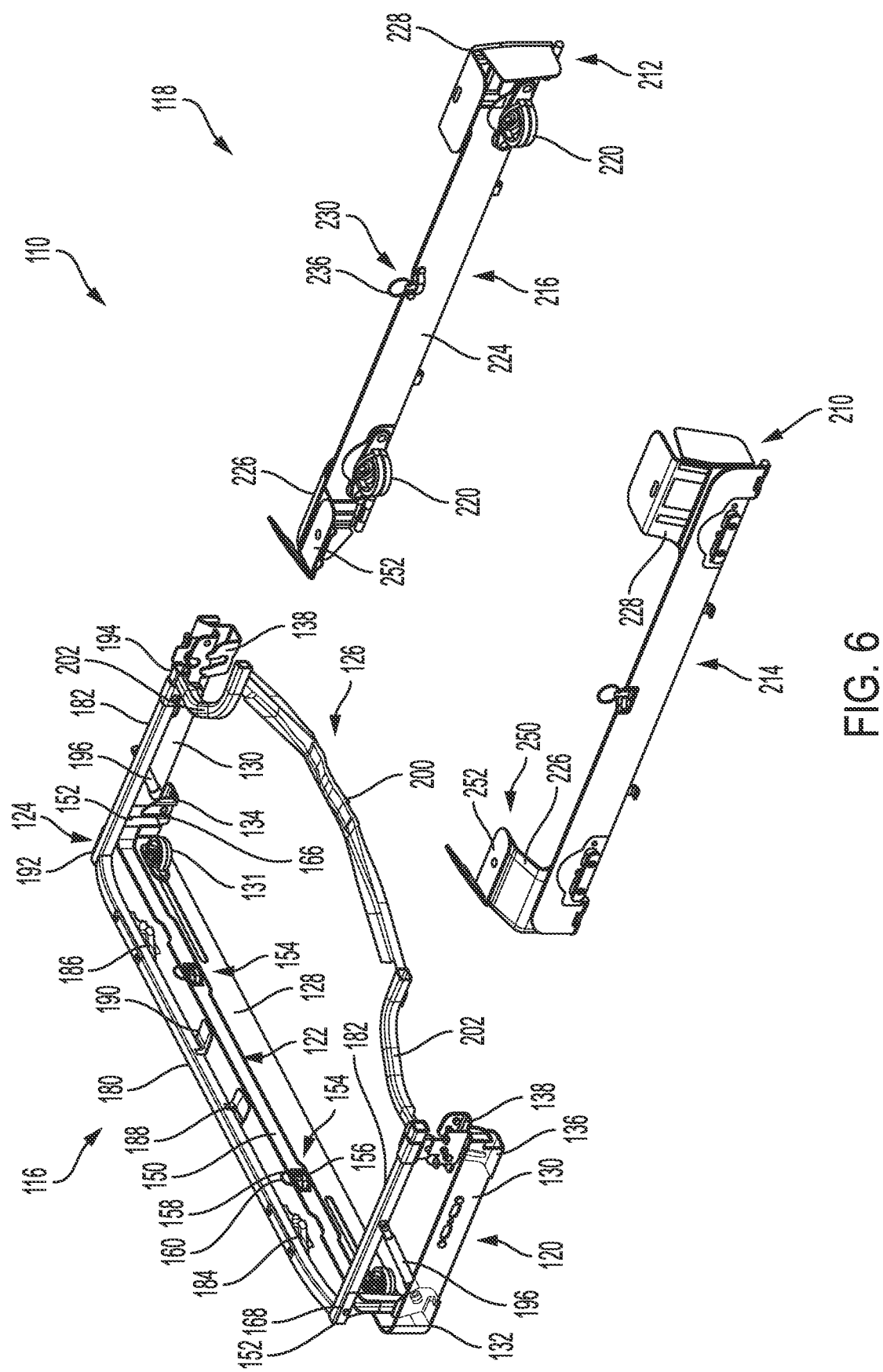
FIG. 6 is a perspective view of a hard top support system that may be utilized with the hard top configuration of FIG. 3, and shown in a deployed position, in accordance with the principles of the present disclosure.

As shown in FIGS. 6-7, in the example embodiment, the truck bed hard top support system 110 generally includes a forward cover support structure or assembly 116 and a rearward cover support structure or assembly 118. The forward cover support assembly 116 is configured to selectively receive and releasably couple with the front passenger roof panels 62a-b. Similarly, the rearward cover support assembly 118 is configured to selectively receive and releasably couple with the rear passenger roof panel 62c.

In the example embodiment, the forward cover support assembly 116 generally includes a base structure 120, a retracting structure 122, a main panel support structure 124, and a selectively deployable secondary panel support structure 126. The base structure 120 is generally U-shaped and includes an intermediate support 128 extending between a pair of side supports 130. The intermediate support 128 is configured to couple to the forward wall 26 via clips/fasteners 131, and the side supports 130 are configured to couple to the side walls 28 via similar clips/fasteners. Each side support 130 includes a proximal end 132 coupled to the intermediate support 128 and including a first inboard support flange 134, and a distal end 136 having a second inboard support flange 138.

In the illustrated example, the retracting structure 122 is rotatably coupled to the base structure 120 and is configured to selectively rotate the main panel support structure 124 between the deployed position (FIG. 5) and the retracted position (FIG. 6). In the example embodiment, the retracting structure 122 generally includes a transverse connecting member 150 coupled to and extending between a pair of opposed support members or posts 152.

The transverse connecting member 150 includes at least one locking assembly 154 configured to selectively lock the retracting structure 122 to the base structure 120 to prevent relative (e.g., rotatable) motion therebetween. In the example implementation, the locking assembly 154 includes an inwardly extending flange 156 defining a receiving aperture 158 to selectively receive a removable pin 160. The flange 156 and aperture 158 are configured to selectively align with a flange 162 and aperture 164 extending inwardly from base structure intermediate support 128. When aligned, apertures 158, 164 can receive the pin 160 to lock the retracting structure 122 to the base structure 120. However, it will be appreciated that assembly 116 may have any suitable locking assembly that enables the system to function as described herein.

Each support post 152 includes a first end 166 and an opposite second end 168. The first end 166 is rotatably coupled to the base structure first inboard support flange 134, and the second end 168 is rotatably coupled to the main panel support structure 124. In this way, retracting support structure 122 functions as a rotatable linkage between the main panel support structure 124 and the base structure 120 that enables the forward cover support assembly 116 to selectively rotate between the deployed and retracted positions.

In the example embodiment, the main panel support structure 124 is configured to provide a direct support surface for front passenger roof panels 62a-b and generally includes a transverse support member 180 coupled to and extending between a pair of side support members 182. The transverse support member 180 includes a pair of latch members 184, 186 and a pair of lock flanges 188, 190. The latch members 184, 186 are configured to be lockingly engaged by the respective locking latches 70, 78 of the front passenger roof panels 62a-b to facilitate securing the panels to the main panel support structure 124. The lock flanges 188, 190 extend outwardly from the transverse support member 180 and are configured to be lockingly engaged by the respective rotatable locking levers 72, 80 of the front passenger roof panels 62a-b to further facilitate securing the panels to the main panel support structure 124.

In the example embodiment, each side support member 182 includes a proximal end 192 and an opposite distal end 194. The proximal end 182 is coupled to the transverse support member 180 and is rotatably coupled to the support post second end 168. The distal end 194 is coupled to the secondary panel support structure 126 and is configured to be cradled or supported by the base structure second inboard support flange 138 when the system is in the deployed and lid closed position, as shown in FIG. 6. Additionally, at least one gas strut assembly 196 is operably coupled between side support member 182 and base structure first inboard support flange 134 to facilitate lifting the front passenger roof panels 62a-b from the closed to the open position.

With continued reference to FIGS. 6 and 7, in the example embodiment, the secondary panel support structure 126 is configured to provide a direct support surface for a rearward end of front passenger roof panels 62a-b. The secondary panel support structure 126 generally includes a central support 200 coupled between a pair of outer support arms 202. The central support 200 is configured to be lockingly engaged by the rear rotatable locking levers 76, 84 of the front passenger roof panels 62a-b, as shown in FIG. 4. The pair of outer support arms 202 extend from the central support 200 and are rotatably coupled to the main panel support structure 124. In this way, the secondary panel support structure 126 is rotatable between a deployed position (FIG. 5) to support the roof panels 62a-b, and a stowed position (FIG. 6), which is flipped toward to the forward wall 26 when not supporting roof panels 62a-b, to thereby provide more unobstructed room in the truck bed 20.

With continued reference to FIGS. 6 and 7, the rearward cover support structure or assembly 118 will be described in more detail. In the example embodiment, the rearward cover support assembly 118 includes a left side assembly 210 and a right side assembly 212. Each assembly 210, 212 generally includes a base attachment 214 and a rotatable support structure 216, which is rotatably coupled to the base attachment 214 and movable between the deployed position (FIG. 6) to support the rear passenger roof panel 62c, and the retracted position within the truck bed (FIG. 7) when the truck bed storage cover 100 is not utilized.

The base attachment 214 is a generally plate-like member configured to couple to one side wall 28 via clips/fasteners 220. The rotatable support structure 216 is a generally plate-like member rotatably coupled to the base attachment 214, for example, via the illustrated hinges 222. The rotatable support structure 216 generally includes a retractable side member 224 with a forward flange 226 and a rearward flange 228 extending inboard therefrom into the cargo area 22. The retractable side member 224 includes at least one locking assembly 230 configured to selectively lock the side member 224 to the base attachment 214 to facilitate preventing relative (e.g., rotatable) motion therebetween. In the example implementation, the locking assembly 230 includes an inwardly extending flange 232 defining a receiving aperture 234 to selectively receive a removable pin 236 (FIG. 6). The flange 232 and aperture 234 are configured to selectively align with a flange 236 and aperture 238 extending inwardly from base attachment 214. When aligned, apertures 234, 238 can receive the pin 236 to lock the retractable side member 224 to the base attachment 214. However, it will be appreciated that assembly 118 may have any suitable locking assembly that enables the system to function as described herein.

In the example embodiment, the forward flange 226 includes a distal end 250 with a hinge member 252, which is configured to couple to a forward end of the rear passenger roof panel 62c. In this way, the rear passenger roof panel 62c is rotatably coupled to the rearward cover support assembly 118 such that rearward lid 114 is movable between the closed position (FIG. 3) and the open position (FIG. 4). When in the closed position, the rear locking levers 88, 92 of the rear roof panel 62c are positioned to selectively lockingly engage the rearward flanges 228 to facilitate preventing opening of the rearward lid 114.

Described herein are systems and methods for vehicles with modular, multi-component convertible hard top assemblies. The convertible hard top assembly includes a plurality of selectively removable panels, windows, and components to facilitate providing an open air vehicle configuration. This also enables a single operator to potentially remove the hard top components alone and advantageously store the hard top assembly components without assistance or specialized equipment. Additionally, on a pickup truck configuration, portions of the hard top assembly may be installed on the truck bed to provide a secured enclosure therefor. A hard top support system is attached to the truck bed and is configured to receive the portions of the hard top assembly. The hard top support system allows first and second portions of the hard top assembly to function as lids movable between open and closed positions.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A vehicle comprising:
   a vehicle body including a truck bed at least partially defining a cargo area;
   a vehicle interior with front passenger seating and rear passenger seating; and
   a modular, multi-component hard top assembly configured to selectively and removably couple interchangeably between:
   (i) the vehicle body to provide an enclosed configuration at least partially enclosing the vehicle interior; and
   (ii) the truck bed to function as a truck bed storage cover to enclose the cargo area and provide a securable storage compartment,
   wherein the multi-component hard top assembly is detachable from the vehicle body to provide an open air configuration for the vehicle interior;
   wherein the hard top assembly comprises:
   a plurality of removable roof panels selectively coupleable to the vehicle body to create a substantially contiguous roof over the vehicle interior;
   wherein each removable roof panel of the plurality of removable roof panels is separately removable from the vehicle body to provide an open air configuration at that specific location of the hard top assembly while enabling a user to detach, remove, and transport a smaller portion of the hard top assembly without assistance or specialized equipment;
   wherein the plurality of removable roof panels includes:
   a left front removable roof panel configured to removably and interchangeably couple to (i) the vehicle body in a location above a driver's side of the front passenger seating, and (ii) the truck bed in a left forward location thereof; and
   a right front removable roof panel configured to removably couple to: (i) the vehicle body in a location above a front passenger side of the front passenger seating, and (ii) the truck bed in a right forward location thereof.

2. The vehicle of claim 1, wherein the multi-component hard top assembly further comprises a pair of removable C-pillars each separately removable from the vehicle body to provide further open air configuration while enabling the user to detach, remove, and transport the C-pillars of the hard top assembly without assistance or specialized equipment.

3. The vehicle of claim 1, wherein the multi-component hard top assembly further includes a removable rear window assembly selectively detachable from the vehicle body to provide an open air configuration at the rear passenger seating while enabling the user to detach, remove, and transport the removable rear window assembly of the hard top assembly without assistance or specialized equipment.

4. The vehicle of claim 1, wherein the left and right front removable roof panels are rotatably coupled to the truck bed and configured to function as a truck bed lid movable between an open position and a closed position.

5. The vehicle of claim 4, wherein the plurality of removable roof panels further includes a rear removable roof panel configured to removably and rotatably couple to the truck bed to function as a second truck bed lid movable between an open position and a closed position.

6. The vehicle of claim 1, wherein the plurality of removable roof panels includes a rear removable roof panel configured to removably and interchangeably couple to (i) the vehicle body in a location above the rear passenger seating, and (ii) the truck bed in a rearward location thereof.

7. A vehicle comprising:
   a vehicle body including a truck bed at least partially defining a cargo area;
   a vehicle interior with front passenger seating and rear passenger seating; and
   a modular, multi-component hard top assembly configured to selectively and removably couple interchangeably between:
   (i) the vehicle body to provide an enclosed configuration at least partially enclosing the vehicle interior; and
   (ii) the truck bed to function as a truck bed storage cover to enclose the cargo area and provide a securable storage compartment,
   wherein the multi-component hard top assembly is detachable from the vehicle body to provide an open air configuration for the vehicle interior;
   wherein the hard top assembly comprises a plurality of removable roof panels selectively coupleable to the vehicle body to create a substantially contiguous roof over the vehicle interior,
   wherein each removable roof panel of the plurality of removable roof panels is separately removable from the vehicle body to provide an open air configuration at that specific location of the hard top assembly while enabling a user to detach, remove, and transport a smaller portion of the hard top assembly without assistance or specialized equipment;
   wherein the plurality of removable roof panels includes a rear removable roof panel configured to removably and interchangeably couple to (i) the vehicle body in a location above the rear passenger seating, and (ii) the truck bed in a rearward location thereof,
   wherein the rear removable roof panel is rotatably coupled to the truck bed and configured to function as a truck bed lid movable between an open position and a closed position.

8. A vehicle comprising:
   a vehicle body including a truck bed at least partially defining a cargo area;
   a vehicle interior with front passenger seating and rear passenger seating;

a modular, multi-component hard top assembly configured to selectively and removably couple interchangeably between:
  (i) the vehicle body to provide an enclosed configuration at least partially enclosing the vehicle interior; and
  (ii) the truck bed to function as a truck bed storage cover to enclose the cargo area and provide a securable storage compartment,
wherein the multi-component hard top assembly is detachable from the vehicle body to provide an open air configuration for the vehicle interior;
wherein the hard top assembly comprises a plurality of removable roof panels selectively coupleable to the vehicle body to create a substantially contiguous roof over the vehicle interior,
wherein each removable roof panel of the plurality of removable roof panels is separately removable from the vehicle body to provide an open air configuration at that specific location of the hard top assembly while enabling a user to detach, remove, and transport a smaller portion of the hard top assembly without assistance or specialized equipment;
wherein the plurality of removable roof panels includes a removable front passenger roof panel and a removable rear passenger roof panel; and
a truck bed hard top support system coupled to the truck bed and configured to support the front and rear passenger roof panels on the truck bed.

9. The vehicle of claim 8, wherein the truck bed hard top support system is configured to move between a deployed position at least partially above the truck bed to support the front and rear passenger roof panels, and a retracted position retracted downward into the truck bed.

10. The vehicle of claim 8, wherein the truck bed hard top support system comprises a forward cover support assembly configured to support the front passenger roof panel.

11. The vehicle of claim 10, wherein the forward cover support assembly is configured rotate the front passenger roof panel between a closed position that at least partially encloses the cargo area, and a lifted open position that allows access to the cargo area.

12. The vehicle of claim 11, wherein the forward cover support assembly includes:
  a base structure;
  a retracting structure;
  a main panel support structure; and
  a secondary panel support structure.

13. The vehicle of claim 12, wherein the retracting structure rotatably couples the main panel support structure to the base structure such that the main panel support structure is movable between a deployed position to support the front passenger roof panel, and a retracted position within the truck bed.

14. The vehicle of claim 12, wherein the secondary panel support structure is rotatably coupled to the main panel support structure and is movable between a deployed position to support the front passenger roof panel, and a stowed position to provide increased space in the cargo area.

15. The vehicle of claim 8, wherein the truck bed hard top support system comprises a rearward cover support assembly configured to support the rear passenger roof panel.

16. The vehicle of claim 15, wherein the rearward cover support assembly is configured to rotate the rear passenger roof panel between a closed position that at least partially encloses the cargo area, and a lifted open position that allows access to the cargo area.

17. The vehicle of claim 16, wherein the rearward cover support assembly includes a left side assembly coupled to left side wall of the truck bed, and a right side assembly coupled to the right side wall of the truck bed,
  wherein the rearward cover support assembly is movable between a deployed position to support the rear passenger roof panel, and a retracted position retracted downward into the truck bed.

* * * * *

UNITED STATES PATENT AND TRADEMARK OFFICE
CERTIFICATE OF CORRECTION

| | |
|---|---|
| PATENT NO. | : 11,433,749 B2 |
| APPLICATION NO. | : 17/124821 |
| DATED | : September 6, 2022 |
| INVENTOR(S) | : Michael S. Boyle et al. |

It is certified that error appears in the above-identified patent and that said Letters Patent is hereby corrected as shown below:

On the Title Page

Item (72) should read: Michael S. Boyle Berkley, Michigan (US), Mikil L. Sockow Troy, Michigan (US), David C. Fischer Troy, Michigan (US), Cole T. Schaenzer Royal Oak, Michigan (US), Robert Rizzo Macomb, Michigan (US), Christopher J. Allen Pleasant Ridge, Michigan (US), Jimmy L. Suder Ortonville, Michigan (US), Jeffery E. Long Canton, Michigan (US)

Signed and Sealed this
Twenty-sixth Day of March, 2024

Katherine Kelly Vidal
*Director of the United States Patent and Trademark Office*